US Patent [19]  
Van Horn

[11] Patent Number: 4,663,847  
[45] Date of Patent: May 12, 1987

[54] HOOF TRIMMER DEVICE

[76] Inventor: Frank Van Horn, 102 N. 67 Ave., Phoenix, Ariz. 85043

[21] Appl. No.: 789,707

[22] Filed: Oct. 21, 1985

[51] Int. Cl.⁴ .............................................. B26B 17/00
[52] U.S. Cl. ...................................... 30/180; 30/187; 30/228
[58] Field of Search .................... 30/92, 134, 175–181, 30/186–193, 228; 81/301

[56] References Cited

U.S. PATENT DOCUMENTS

| 451,668 | 5/1891 | Hamilton . |
| 492,931 | 3/1893 | Baird . |
| 640,257 | 1/1900 | Baer . |
| 693,231 | 2/1902 | Carter . |
| 1,000,821 | 8/1911 | Krickel . |
| 1,056,379 | 3/1913 | Thomas . |
| 1,066,675 | 7/1913 | Stowell . |
| 1,144,738 | 6/1915 | Stubkjare . |
| 1,275,659 | 8/1918 | Cartwright . |
| 2,499,098 | 2/1950 | Howe . |
| 2,523,368 | 9/1950 | Howe . |
| 2,613,437 | 10/1952 | McPhee .............................. 30/228 |
| 2,791,028 | 5/1957 | Bidin . |
| 3,138,869 | 6/1964 | Parhaniemi . |
| 3,706,245 | 12/1972 | Van Schaik . |
| 3,893,237 | 7/1975 | Jahnke . |
| 4,130,938 | 12/1978 | Uhlman . |
| 4,392,263 | 7/1983 | Amoroso .......................... 30/134 X |
| 4,521,963 | 6/1985 | Lind et al. . |

FOREIGN PATENT DOCUMENTS 373538 6/1922 Fed. Rep. of Germany ........ 30/180

Primary Examiner—E. R. Kazenske  
Assistant Examiner—Michael D. Folkerts  
Attorney, Agent, or Firm—LaValle D. Ptak

[57] ABSTRACT

A hydraulically operated hoof nipper of hoof trimming device comprises a pair of opposed C-shaped cutting blades mounted on first and second lever arms. The lever arms for the blades have two pivot points, a common one in the center connected to both blades and one on the outer end of each lever arm. The pivots on the outer ends of the lever arms are coupled through first and second adjustable-length control rods for adjusting the overlap on the blades to compensate for wear and the like. The opposite ends of the control rods are pivotally mounted on a frame and an hydraulically operated reciprocating control rod moves through the frame between the control rods to move the center pivot toward and away from the frame to close and open the cutting blades.

14 Claims, 5 Drawing Figures

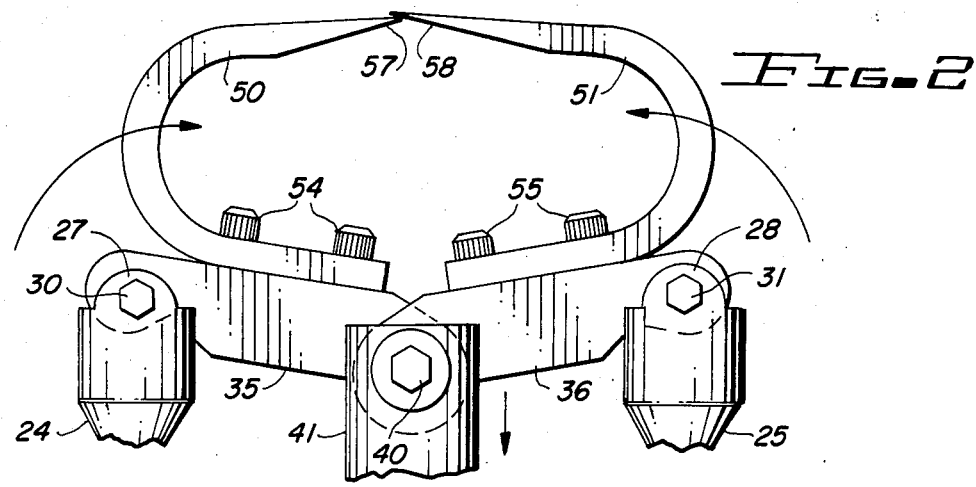
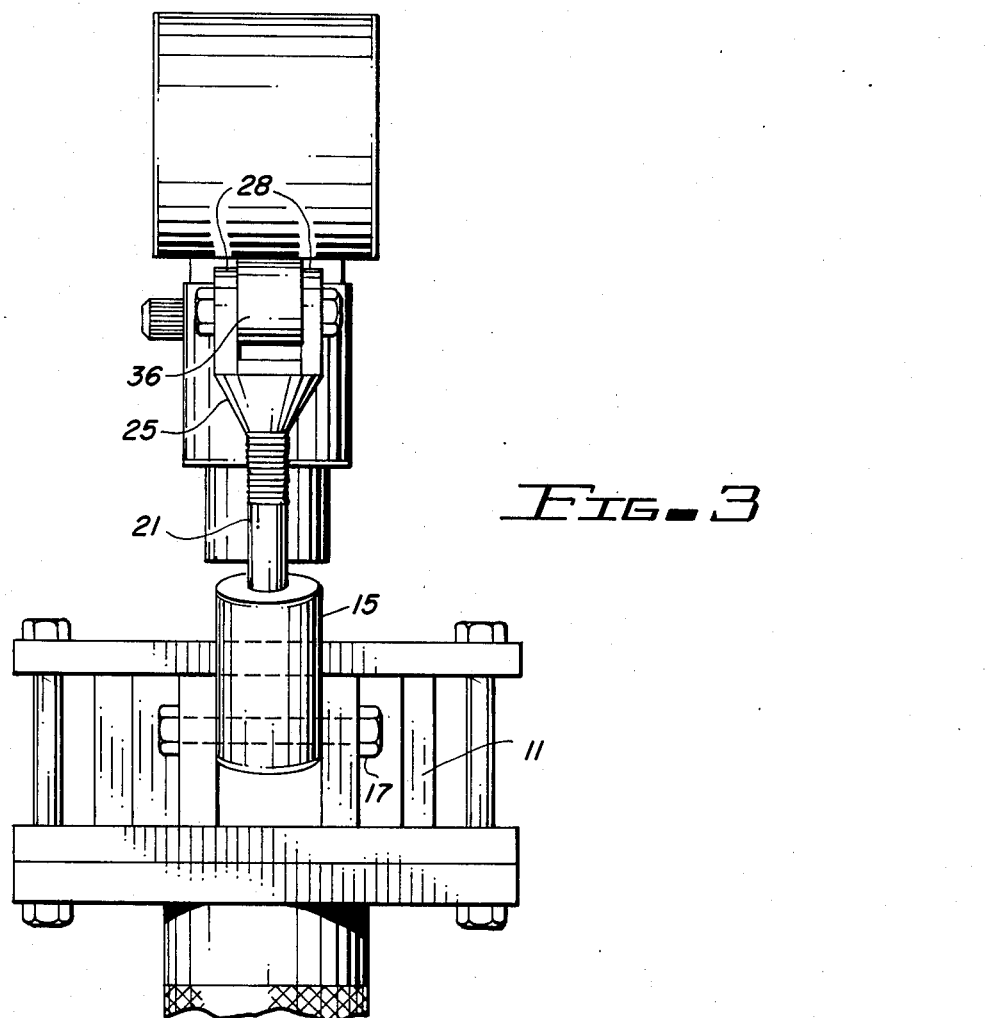
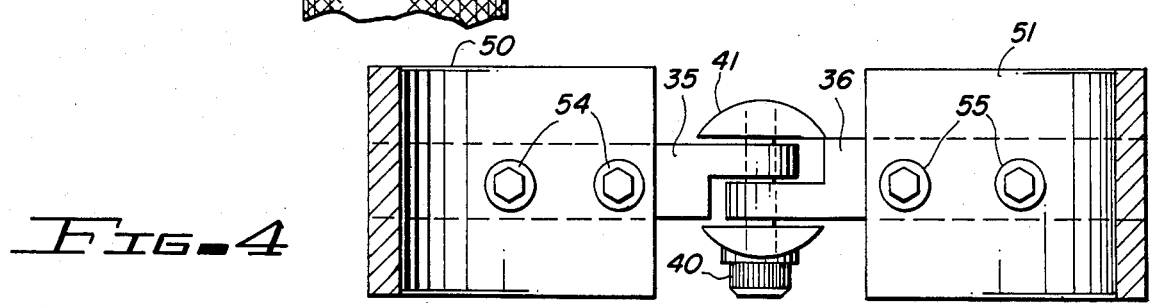

HOOF TRIMMER DEVICE

BACKGROUND

Livestock, particularly those confined to relatively small spaces, such as dairy cattle, require relatively frequent trimming or cutting of excess growth of the hooves. Prior art cutters or hoof nippers have a pair of opposing jaws provided with cutting blades which are moved toward and away from one another when the handles of the cutter are manually operated by a user. Animal hooves are relatively hard and a relatively large amount of force or high pressure must be exerted upon the cutting blades to accomplish the trimming of the hooves. Various lever linkages have been provided in the past to assist a person doing such trimming to exert the necessary force, but hand operated hoof cutters or hoof nippers still produce a great deal of stress on the hands and arms of the person doing the trimming. Even with strong persons having considerable experience, fatigue in the use of conventional hoof trimers or hoof nippers substantially limits the number of hooves which can be trimmed in any given session.

Another disadvantage of hoof nipper or hoof trimmers is that the cutting blades wear out relatively quickly and require frequent shapening. This wear results from abrasion in the form of sand and rocks which are picked up in the animal's hooves. Consequently, the blade closure must be capable of compensating for this wear and resharpening in order to prolong the life of the tool.

Typical hand-operated hoof trimmers or hoof nippers of the type commonly employed are disclosed in the patents to Baer U.S. Pat. No. 640,257; Stowell U.S. Pat. No. 1,066,675; and Uhlmann U.S. Pat. No. 4,130,938. In all of these patents, inter-engaging gears or toothed racks are provided between the handle and the opposed cutting blades to multiply the force obtained from squeezing the handle portions together. The mechanisms of these three patents differ somewhat from one another, but the underlying concept is the same. Even with this multiplication of force, however, such hoof cutters tire any person who is attempting to trim the hooves of a large number of animals in succession.

Three other patents directed to hoof trimming tools using rotating cutting blades are the patents to Krickel U.S. Pat. No. 1,000,821; Thomas U.S. Pat. No. 1,056,379; and Howe U.S. Pat. No. 2,523,368. The devices of these three patents are somewhat impractical since they are cumbersome to use. All of them require the animal's hoof to be in the same fixed position during the trimming operation. As a result, it is difficult for the operator to trim or cut at different angles, and also use the tool to scalp the pad of the hoof.

Power shears, pruning devices and the like have been provided to produce a relatively high pressure closure between a pair of opposed blades without requiring substantial amounts of squeezing force on the part of the user of such devices. Four patents of this type are the patents to Baird U.S. Pat. No. 492,931; Carter U.S. Pat. No. 693,231; Parhaniemi U.S. Pat. No. 3,138,869; and Lind U.S. Pat. No. 4,521,963. In Baird a threaded wedge is forced between the ends of two opposed pivoted lever arms for applying a highly multiplied force to the cutting blades of a bolt cutting machine. In another embodiment, a multiple point pivot arrangement is used instead of the wedge, with a pair of short lever arms engaging the ends of the longer lever arms which are attached to the bolt cutting head.

The Carter and Lind patents are directed to hydraulically operated bolt cutting devices and the Parhaniemi patent discloses a pruning device which uses either a hand-operated or electrically operated elongated rod to move a pair of interconnecting levers in a manner similar to the device of Baird. All of these patents employ interconnected levers and pivots in which elongated levers having the cutting blades at one end are pivotally connected to intermediate levers, the opposite ends of which are connected in common to the operating piston or rod. These interconnecting levers are relatively long; and in all of these devices, a relatively long stroke of the operating piston or rod is necessary to effect the cutting action for a relatively short distance of movement of the cutting blades. In addition, substantial pressure is applied to the intermediate pivot points of the interconnected rods and these intermediate pivot points move a relatively wide distance toward and away from the axis of the operating piston or rod.

Another group of patents which is comparable in many ways to the devices disclosed in the Baird, Carter, Parhaniemi, and Lind patents are the power driven or hydraulic shears and pliers disclosed in the patents to Cartwright U.S. Pat. No. 1,275,659; Bidin U.S. Pat. No. 2,791,028; Van Schaik U.S. Pat. No. 3,706,245; and Jahnke U.S. Pat. No, 3,893,237. None of these patents are directed to hoof nippers and all of the devices require a rather substantial axial movement of the operating piston or cylinder to accomplish a relatively limited movement between open and closed position of the cutting blades.

It is desirable to provide a sturdy, light-weight, easily manipulated power hoof trimmer or hoof nipper which overcomes the disadvantages of the prior art devices listed above. In addition, it is desirable to provide such a hoof nipper with adjustable and replaceable blades to prolong the usefulness of the operating life of the tool.

SUMMARY OF THE INVENTION

It is an object of this invention to provide an improved hoof cutter or trimmer.

It is another object of this invention to provide an improved power operated hoof cutter or trimmer.

It is additional object of this invention to provide an improved hydraulically operated hoof cutter or trimmer.

It is a further object of this invention to provide an hydraulically operated hoof cutter or trimmer having adjustable and replaceable cutting blades.

It is yet another object of this invention to provide a reliable, rugged, easily manipulated, hydraulic hoof cutter of trimmer.

In accordance with a preferred embodiment of this invention, a hoof cutter or hoof trimming device has a frame with a reciprocating operating rod mounted on the frame. The rod is coupled at one end with the first ends of first and second lever arms which have first and second opposed trimming blades mounted on them respectively. The blades have a generally C-shaped cross-section, with the open parts facing one another. First and second control rods are pivotally connected between the second ends of the first and second lever arms, respectively, and the frame. The reciprocating movement of the operating rod effects relative movement between the frame and the first ends of the first and second lever arms to move cutting edges of the first and second trimming blades between open and closed positions.

BRIEF DESCRIPTION OF THE DRAWINGS

FIG. 2 is a view of a portion of the embodiment shown in FIG. 1, illustrating the trimming blades in a closed position;

FIG. 3 is an end view of the embodiment shown in FIG. 1;

FIG. 4 is a cross-sectional view taken along the line 4—4 of FIG. 1; and

DETAILED DESCRIPTION

Figure 1:
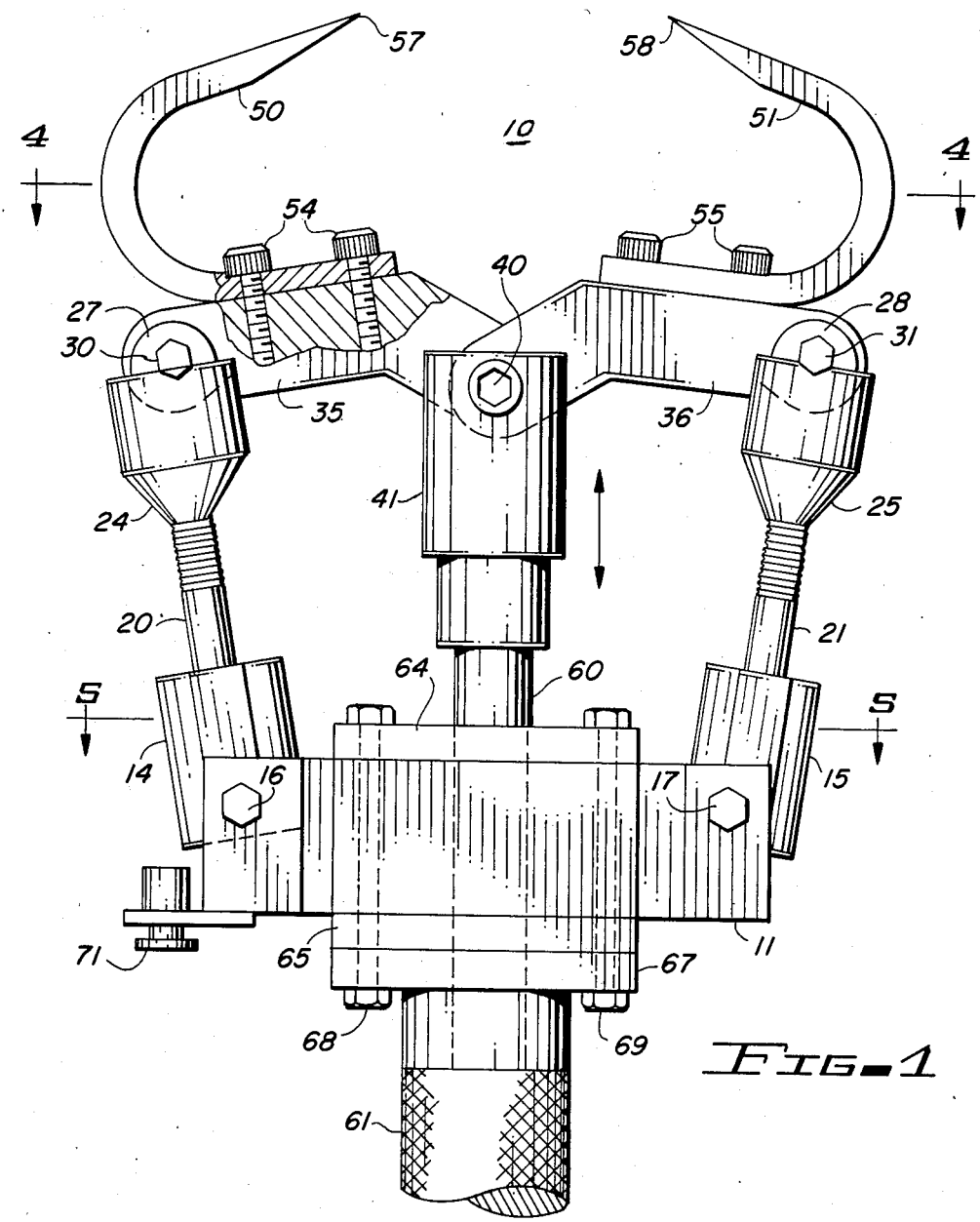
FIG. 1 is a side view of a preferred embodiment of the invention.

Reference now should be made to the drawings in which the same reference numbers are used throughout the different Figures to designate the same components. Reference first should be made to FIG. 1. In this Figure, a hoof nipper or a hoof trimming device 10 utilizes a frame member or base 11 for supporting the various parts of the trimming device. A pair of support blocks 14 and 15 are pivotally mounted on opposite sides of the base 11 on pivots 16 and 17, respectively, for relative movement toward and away from one another in the plane of FIG. 1. The blocks 14 and 15 have associated control rods 20 and 21 attached to them. The rods 20 and 21 are threaded on their upper ends and threadedly engaged a pair of upper support blocks 24 and 25. The relative distance between the support blocks 24 and 25 and thus between the pivots 16 and 17 is adjustable by rotating the blocks 24 and 25 on the rods 20 and 21 in either direction. The upper blocks 24 and 25 have a pair of opposed up-standing spaced flanges 27 and 28, respectively, for supporting pivots 30 and 31.

First and second trimming blade support levers 35 and 36 are pivotally supported at one end by the corresponding pivots 30 and 31 which pass through holes in the levers 35 and 36. As illustrated most clearly in FIG. 3, the pivoted ends of the levers 35 and 36 are located between the flanges 27 and 28 for pivotal movement relative to the upper support blocks 24 and 25.

The opposite ends of the lever arms 35 and 36 are pivotally interconnected by means of a common pivot 40 passing through them and through the upper end of a slotted support block 41. This connection is shown most clearly in FIG. 4, which illustrates the manner in which the lever arms 35 and 36 are mounted in the slot in the upper end of the block 41.

A pair of generally C-shaped cutting blades 50 and 51 are mounted respectively on the lever arms 35 and 36 by means of threaded fasteners 54 and 55. This is shown most clearly in FIGS. 1, 2 and 4. The blades 50 and 51 have cutting or trimming edges 57 and 58 on them. In FIG. 1 the blades are shown in the open position and in FIG. 2, they are shown in the closed or cutting position.

In order to effect the opening and closing of the blades 50 and 51 to separate and bring together the cutting edges 57 and 58, the block 41 is attached to a rod 60 which in turn is reciprocated in the direction of the arrows shown in FIG. 1 by means of a hydraulic cylinder 61 which also serves as a handle for the device. The manner in which the hydraulic mechanism reciprocates the rod 60 is not illustrated since this can be accomplished with known hydraulic systems.

Figure 5:
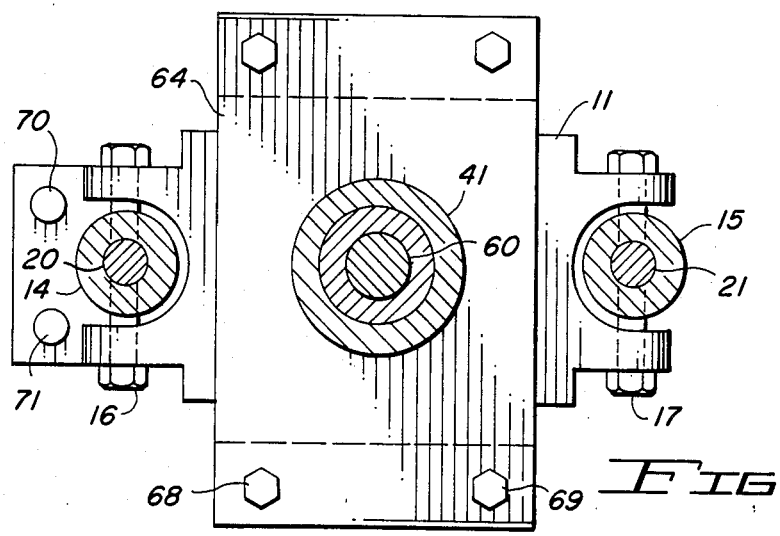
FIG. 5 is a cross-sectional view taken along the line 5—5 of FIG. 1.

A pair of operating switches 70 and 71 (show most clearly in FIGS. 1 and 5) are placed adjacent the handle 61 for engagement by the thumb or finger of the person operating the tool. One of the switches, for example switch 70, is used to move the operating rod 60 upward, as viewed in FIG. 1; and the other switch, switch 71, is operated to cause the hydraulic system in the handle 61 to move the rod 60 downwardly, as shown in FIG. 1.

As illustrated in FIG. 1, the rod 60 is in its uppermost position following engagement of the switch 70 by the operator. This causes the pivot point 40 to be moved upwardly, resulting in a slight outward movement of the control rods 20 and 21 effected by pivoting them about the pivots 16, 17, 30 and 31. This amount of outward movement is relatively small to provide the relatively wide opening between the cutting edges 57 and 58 of the blades 50 and 51. It should be noted that the pivots 16 and 17 are located on opposite sides of the axis of the rod 60 a greater distance apart than the distance between the cutting edges 57 and 58 in the open position.

When the tool is placed in position adjacent the hoof to be trimmed, the switch 71 is depressed. This causes the hydraulic mechanism in the handle 61 to pull the operating rod 60 downwardly as shown in FIGS. 1 and 2. This results in closure of the cutting edges 57 and 58 of the blades 50 and 51, as illustrated in FIG. 2. It is readily apparent from an examination of FIG. 2 that the downward movement of the block 41 and the rod 60 is considerably less than the distance between the open and closed position of the cutting edges of the blades 50 and 51. When the rod 60 and the block 41 are moved downwardly to the position shown in FIG. 2, the control rods 20 and 21 move a short distance toward one another at their upper ends on the pivots 16, 17, 30 and 31.

Any suitable commercially available hydraulic mechanisms may be employed for reciprocating the operating rod 60. For that reason the details of the hydraulic system and the interconnecting controls between the switches 70, 71 and the hydraulic mechanism have not been shown.

The hydraulic piston handle 61 and the operating rod 60 are interconnected with the block or frame 11 by means of a pair of upper and lower cover plates 64 and 65. The end of the handle 61 is attached to an enlarged flange 67. A pair of bolts 68 and 69, passing through corresponding holes in the flange 67, the plates 64 and 65 and the block 11, are used to clamp or sandwich the entire assembly together, as illustrated in the Figures of the drawing.

When the cutting edges 57 and 58 of the blades 50 and 51 become dull, wear down or otherwise become damaged, the blades may be sharpened, either by leaving them in place on the tool in the open position shown in FIG. 1 or after removing the blades through the release of the threaded fasteners 54 and 55. The resharpened blades then are remounted (if they were removed) and the tool is operated to its closed position. If the cutting edges do not come together with a slight overlap as illustrated in FIG. 2, the pivots 30 and 31 are removed and the blocks 24 and 25 are swung outwardly away from the ends of the lever arms 35 and 36. The blocks 24 and 25 then are rotated on the threaded ends of the control rods 20 and 21 to move them upwardly on the ends of the rods 20 and 21 until the position is reached where, with the pivots 30 and 31 in place, the cutting edges 57 and 58 of the blades 50 and 51 occupy the position shown in FIG. 2. As a result, periodic adjustments as the blades 50 and 51 wear down, through sharpening or through use, may be effected to prolong the effective useful life of the blades.

When the blades 50 and 51 are worn to a point where further adjustment is not possible, the blades may be removed and replaced with new blades 50 and 51. When new blades are placed on the tool, the pivot pins 30 and 31 are removed, the blocks 24 and 25 are rotated downwardly on the ends of the control rods 20 and 21 to cause the closed position of the new blades to be as illustrated in FIG. 2. As these new blades wear, periodic adjustments of the position of the blocks 24 and 25 on the ends of the rods 20 and 21 may be effected in the manner described previously. By providing replaceable blades 50 and 51 in the manner described above, the useful life of the tool is practically unlimited. The blades 50 and 51 are relatively inexpensive and are the only parts of the tool which are subject to relatively rapid wear.

The foregoing description of the preferred embodiment of the invention is to be considered illustrative of the invention and not as limiting. For example, different techniques may be employed for effecting adjustment of the closed position of the cutting blades to compensate for wear and the like. The shapes of the different interconnecting parts is not to be considered limiting, since a variety of different shapes of the various levers, control rods and the like may be employed. The device is illustrated full-size; so that it is apparent it is a compact and easy to handle tool. Various changes and modifications will occur to those skilled in the art without departing from the scope of the invention which is defined by the appended claims.

I claim:

1. A hoof trimmer device including in combination:
   a frame means;
   first and second lever arms each having first and second ends;
   first and second opposed trimming blade means having elongated trimming edges, said edges being parallel to one another and moveable between open and closed positions, each blade means having a generally C-shaped cross-section, the open parts of which face one another, with corresponding portions of each of said first and second trimming blade means being mounted on said first and second lever arms, respectively, for movement of said blade means between the open and closed positions and wherein the trimming edges of said blade means contact one another along the entire length thereof in the closed position;
   reciprocating operating rod means having an axis perpendicular to the plane of the trimming edges of said blade means in the closed position thereof, said rod means mounted on said frame means and pivotally coupled at a first pivot point with said first and second lever arms at the first ends thereof adjacent the open parts of said first and second C-shaped blade means;
   first and second control rods each having first and second ends;
   means for pivotally connecting said first control rod between the second end of said first lever arm and said frame means, and means for pivotally connecting said second control rod between the second end of said second lever means and said frame means, the distance between the connections of said control rods on said frame means being greater than the distance between the trimming edges of said blade means in the open position thereof;
   means for varying the lengths of said first and second control rods over a predetermined range to cause corresponding adjustment of the closed position of said trimming blade means to compensate for wear of said blade means throughout the life thereof; and
   means for effecting relative movement of said frame means and the first ends of said first and second lever arms toward and away from one another through reciprocating movement of said operating rod means to move the trimming edges of said first and second blade means between the open and closed positions thereof.

2. The combination according to claim 1 wherein the first ends of said first and second lever means are interconnected with said reciprocating operating rod means through a common pivot.

3. The combination according to claim 2 wherein the first ends of said first and second control rods are pivotally connected, respectively, with the second ends of said first and second lever arms; and the second ends of said control rods are pivotally connected to said frame means at points on diametrically opposite sides of said operating rod means.

4. The combination according to claim 2 wherein said operating rod means is mounted on said frame means for reciprocating movement therethrough to move said first pivot point toward and away from said frame means to respectively close and open said trimming blade means.

5. The combination according to claim 4 wherein said means for varying the length of said first and second control rods comprises first portions on each of said control rods threadedly engaging said portions on each of said control rods to change the effective lengths of said control rods.

6. The combination according to claim 5 wherein said first and second trimming blade means are removably mounted on said first and second lever arms.

7. The combination according to claim 6 further including handle means attached to said frame means.

8. The combination according to claim 7 further including switch means mounted on said frame means adjacent to said handle means for controlling the operation of said reciprocating operating rod means.

9. The combination according to claim 1 wherein the first ends of said first and second control rods are pivotally connected, respectively, with the second ends of said first and second lever arms; and the second ends of said control rods are pivotally connected to said frame means at points on diametrically opposite sides of said operating rod means.

10. The combination according to claim 1 wherein said operating rod means is mounted on said frame means for reciprocating movement therethrough to move said first pivot point toward and away from said frame means to respectively close and open said trimming blade means.

11. The combination according to claim 1 wherein said first and second trimming blade means are removably mounted on said first and second lever arms.

12. The combination according to claim 1 further including handle means attached to said frame means.

13. The combination according to claim 12 further including switch means mounted on said frame means adjacent to said handle means for controlling the operation of said reciprocating operating rod means.

14. The combination according to claim 13 wherein said means for varying the length of said first and second control rods comprises first portions on each of said control rods threadedly engaging second portions on each of said control rods to change the effective lengths of said control rods.

* * * * *